(12) United States Patent
Roach et al.

(10) Patent No.: US 8,763,392 B2
(45) Date of Patent: Jul. 1, 2014

(54) HYDRAULIC BOOSTER VENTED INPUT ROD WITH POPPET

(75) Inventors: Brian Edward Roach, Osceola, IN (US); Roger Miller, Edwardsburg, MI (US)

(73) Assignee: Robert Bosch GmbH, Stuttgart (DE)

( * ) Notice: Subject to any disclaimer, the term of this patent is extended or adjusted under 35 U.S.C. 154(b) by 1005 days.

(21) Appl. No.: 12/847,686

(22) Filed: Jul. 30, 2010

(65) Prior Publication Data
US 2012/0023926 A1 Feb. 2, 2012

(51) Int. Cl.
*B60T 13/16* (2006.01)

(52) U.S. Cl.
USPC .......................................................... 60/548

(58) Field of Classification Search
USPC .......................................................... 60/548
See application file for complete search history.

(56) References Cited

U.S. PATENT DOCUMENTS

| | | | |
|---|---|---|---|
| 2,318,756 A * | 5/1943 | Chouings | 60/548 |
| 4,642,990 A | 2/1987 | Mizusawa et al. | |
| 4,899,640 A | 2/1990 | Kono | |
| 6,367,254 B1 * | 4/2002 | Takasaki et al. | 60/548 |
| 7,083,240 B2 | 8/2006 | Matsuno et al. | |
| 2004/0212248 A1 | 10/2004 | Cadeddu | |

FOREIGN PATENT DOCUMENTS

DE  1107099 B  5/1961

* cited by examiner

*Primary Examiner* — F. Daniel Lopez

(74) *Attorney, Agent, or Firm* — Maginot, Moore & Beck

(57) ABSTRACT

A hydraulic brake booster system. The hydraulic brake booster system includes a primary piston axially moveable within a bore of a cylinder, a booster chamber located rearwardly of the primary piston within the bore, an input rod extending within the booster chamber, a booster vent path in selective fluid communication with the booster chamber, and a seal member located between the forward face and the primary piston, the seal member in a fixed relationship with the input rod and configured to (i) seal the booster vent path from the booster chamber when the input rod is in a first position, and (ii) not seal the booster vent path from the booster chamber when the input rod is moved rearwardly within the booster chamber to a second position.

14 Claims, 8 Drawing Sheets

HYDRAULIC BOOSTER VENTED INPUT ROD WITH POPPET

FIELD

The invention relates to a booster in a braking application, and in particular to a hydraulic booster assembly.

BACKGROUND

In a typical modern vehicular braking system a booster assembly provides braking assistance to an operator of a vehicle during a braking operation. The booster assembly is mechanically energized by the engine or by an electrically driven pump.

A vacuum booster assembly has historically been used to provide the booster functionality. Hydraulic boosters are also used. In either case (vacuum or hydraulic), the booster assembly provides a force to a primary piston of a master cylinder that is proportional to the amount of the brake pedal force that is applied by the operator. The master cylinder functionality may be provided by a separate master cylinder assembly, or the functionality may be integrated within the booster assembly.

In an integrated hydraulic booster-master cylinder combination, fluid pressure from a high pressure source is regulated by a booster valve in response to the brake pedal force. Fluid within a booster chamber, which is at the regulated pressure, is applied to the primary piston of the master cylinder portion of the combination in order to move the primary piston from a rest position (i.e., an unapplied position) to an applied position. The master cylinder and the primary piston define a primary chamber which is in fluid communication with a braking circuit. Moving the primary piston pressurizes fluid in the primary chamber, thereby pressurizing fluid in the braking circuit. In order to return the primary piston to the rest position or to an intermediate position between the applied position and the rest position, in response to a full or partial release of the brake pedal by the operator, the booster fluid that is within the booster chamber must be vented to reduce or eliminate the pressure applied to the primary piston by the fluid in the booster chamber. Without proper venting of the fluid in the booster chamber, the trapped fluid impedes or prevents the desired return of the primary piston to the unapplied position.

There is a need to provide an improved hydraulic boosted braking system that efficiently vents trapped fluid in the booster chamber to a reservoir to allow return of the primary piston with reduced impedance in the master cylinder in response to the brake pedal being released.

SUMMARY

According to one embodiment of the present disclosure, there is provided a hydraulic brake booster system. The hydraulic brake booster system includes a primary piston axially moveable within a bore of a cylinder, a booster chamber located rearwardly of the primary piston within the bore, an input rod extending within the booster chamber, a booster vent path in selective fluid communication with the booster chamber, and a seal member located between the forward face and the primary piston, the seal member in a fixed relationship with the input rod and configured to (i) seal the booster vent path from the booster chamber when the input rod is in a first position, and (ii) not seal the booster vent path from the booster chamber when the input rod is moved rearwardly within the booster chamber to a second position.

According to one embodiment of the present disclosure, there is provided a hydraulic brake booster system. The hydraulic brake booster system includes a cylinder bore, a primary piston axially moveable within the cylinder bore, a booster chamber defined between the primary piston and a sleeve bearing, an input rod extending forwardly through the sleeve bearing toward the primary piston, a booster vent path extending rearwardly from a forward face of the input rod, and an annular seal member fixedly associated with the input rod and movable therewith, the seal member positioned between the forward face of the input rod and the primary piston and configured to form a seal with the primary piston isolating the booster vent path from the booster chamber.

DESCRIPTION

Figure 1:
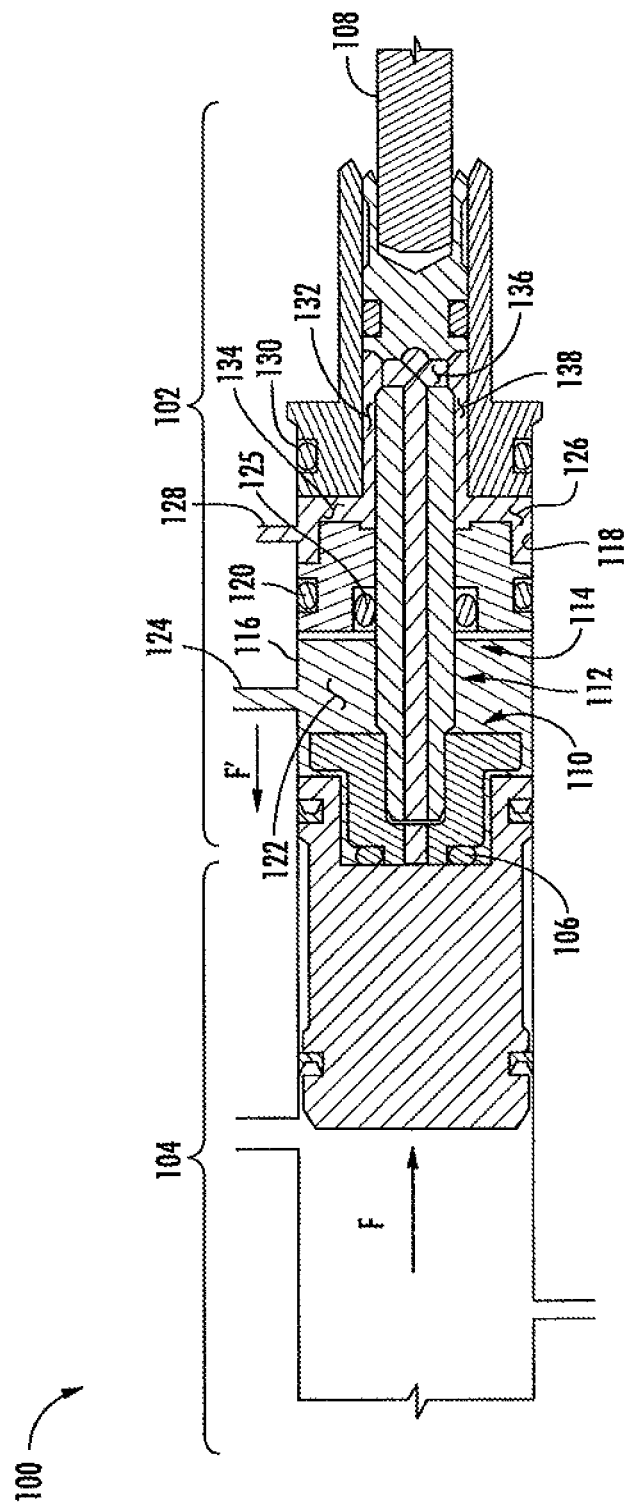
FIG. 1 depicts a fragmentary cross sectional view of an integrated hydraulic booster-master cylinder assembly (brake system), depicted in a first position.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a fragmentary cross sectional view of a braking system 100 is depicted. The braking system 100 includes an integrated hydraulic booster-master cylinder assembly that contains a boost chamber portion 102.

The boost chamber portion 102 depicted in FIG. 1 is sealingly coupled with a master cylinder portion 104 by a seal 106. The boost chamber portion 102 is coupled to a brake pedal (not shown) by a rod 108. An input rod spring (not shown) or other biasing member(s) may be coupled to the rod 108 to bias the rod 108 to an unapplied position corresponding to a released position of the braking system 100 as depicted in FIG. 1.

It should be appreciated that the boost chamber portion 102 may be mechanically controlled by a mechanical linkage between the brake pedal and a valve system (not shown) provided for regulating pressure within the boost chamber portion 102. The boost chamber portion 102 may also be electrically coupled to the brake pedal (not shown), where a sensor (not shown) coupled to the brake pedal (not shown)

provides a signal to the boost chamber portion 102 to regulate pressure therein. The sensor (not shown) may be a brake pedal position sensor or a brake pedal force sensor. The first type provides a varying electrical signal based on the position of the brake pedal (not shown). The second type provides a varying electrical signal based on a force applied to the brake pedal. Where position sensors are referenced throughout the description, it should be appreciated that a position sensor may be replaced with a force sensor for the purpose of providing an electrical signal to the valve system (not shown). Similarly, where force sensors are referenced throughout the description, it should be appreciated that a force sensor may be replaced with a position sensor for the purpose of providing an electrical signal to the valve system (not shown). Where a sensor is referenced, it should also be appreciated that a direct linkage between the brake pedal (not shown) and the boost chamber portion 102 may be used for the purpose of controlling the valve system (not shown) in order to control pressure within the boost chamber portion 102.

The boost chamber portion 102 includes a poppet assembly 110, an input rod assembly 112, and a sleeve bearing assembly 114. The poppet assembly 110, the input rod assembly 112, and the sleeve bearing assembly 114 are disposed within a cylinder 116 having a bore 118. The sleeve bearing assembly 114 sealingly couples to the cylinder 116 with seals 120 and 130. The sleeve bearing assembly 114 sealingly couples to the input rod assembly 112 with a seal 125. The poppet assembly 110, the input rod assembly 112, and the sleeve bearing assembly 114 define a booster chamber 122. The booster chamber 122 is in fluid communication with a regulated pressure source (not shown) by a fluid inlet 124. The booster chamber 122 is sealed by the seals 106, 120, 125, and 154 (see FIG. 2).

The sleeve bearing assembly 114 and the cylinder 116 define a low pressure chamber 126. The low pressure chamber 126 is in fluid communication with a reservoir (not shown) via a fluid passage 128. The low pressure chamber 126 is sealed from the outside of the boost chamber portion 102 by at least a seal 130 and a seal 262 (see FIG. 3). The low pressure chamber 126 includes an annular vent chamber 132, a first radial vent 134, and a second radial vent 136. The annular vent chamber 132 is formed by the input rod assembly 112 and a reduced diameter portion 138 of the cylinder 116. The first radial vent 134 extends radially inwardly from the fluid passage 128. The second radial vent chamber 136 extends radially inwardly from the annular vent chamber 132.

While the cylinder 116 is depicted as extending uniformly between the boost chamber portion 102 and the master cylinder portion 104, the reader should appreciate that the cylinder 116 may have different dimensions about the boost chamber portion 102 as compared to the master cylinder portion 104.

Figure 2:
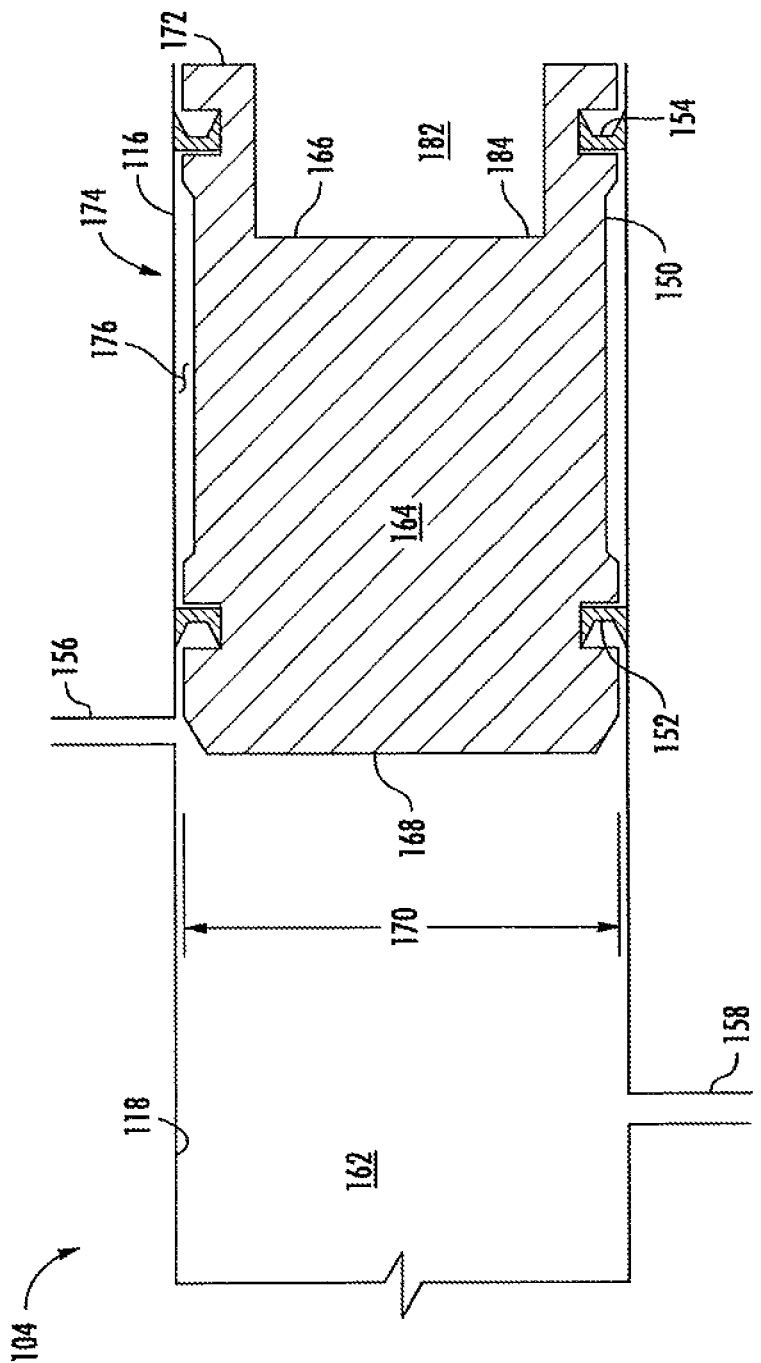
FIG. 2 depicts a cross sectional view of the master cylinder portion of the brake system depicted in FIG. 1.

Referring to FIG. 2, the master cylinder portion 104 is depicted. The master cylinder portion 104 includes a primary piston 150, seals 152 and 154, an inlet 156, and an outlet 158. The seals 152 and 154 extend annularly about the primary piston 150. The primary piston 150 is slidably disposed within the bore 118 of the cylinder 116. The primary piston 150 and the bore 118 define a primary chamber 162 for pressurizing fluid therein. The inlet 156 fluidly couples the primary chamber 162 with the reservoir (not shown). The outlet 158 fluidly couples the primary chamber 162 with a downstream braking circuit (not shown).

The primary piston 150 includes a front portion 164 and a rear portion 166. The front portion 164 includes an active face 168 which provides a diameter 170. The front portion 164 is in contact with pressurized fluid of the primary chamber 162. The rear portion 166 includes an active face 172 which is in fluid communication with the booster chamber 122.

An annular space 176 is defined between the seals 152 and 154. The annular space 176 is formed by a reduced area of the piston 150 between the front portion 164 and the rear portion 166 and the cylinder 116. The seal 152 is configured to seal the primary chamber 162 from the inlet 156 and thereby from the reservoir (not shown). The seal 154 is configured to seal the boost chamber 122 from the inlet 156 and thereby from the reservoir (not shown). Fluid within the annular space 176 is substantially at the pressure of the reservoir. The annular space 176 at certain positions of the primary piston 150 becomes in fluid communication with the inlet 156 to thereby vent fluid therein to the reservoir (not shown).

A rearward facing cavity 182 may be formed in the rear portion 166 of the primary piston 150 to receive the poppet assembly and includes an active face 184 to interface with the poppet assembly 110 and the seal 106 (see FIG. 1). If the piston 150 is configured without the rearward facing cavity 182, the poppet assembly 110 may be configured to interface directly with the active face 172 of the primary piston 150.

Figure 3:
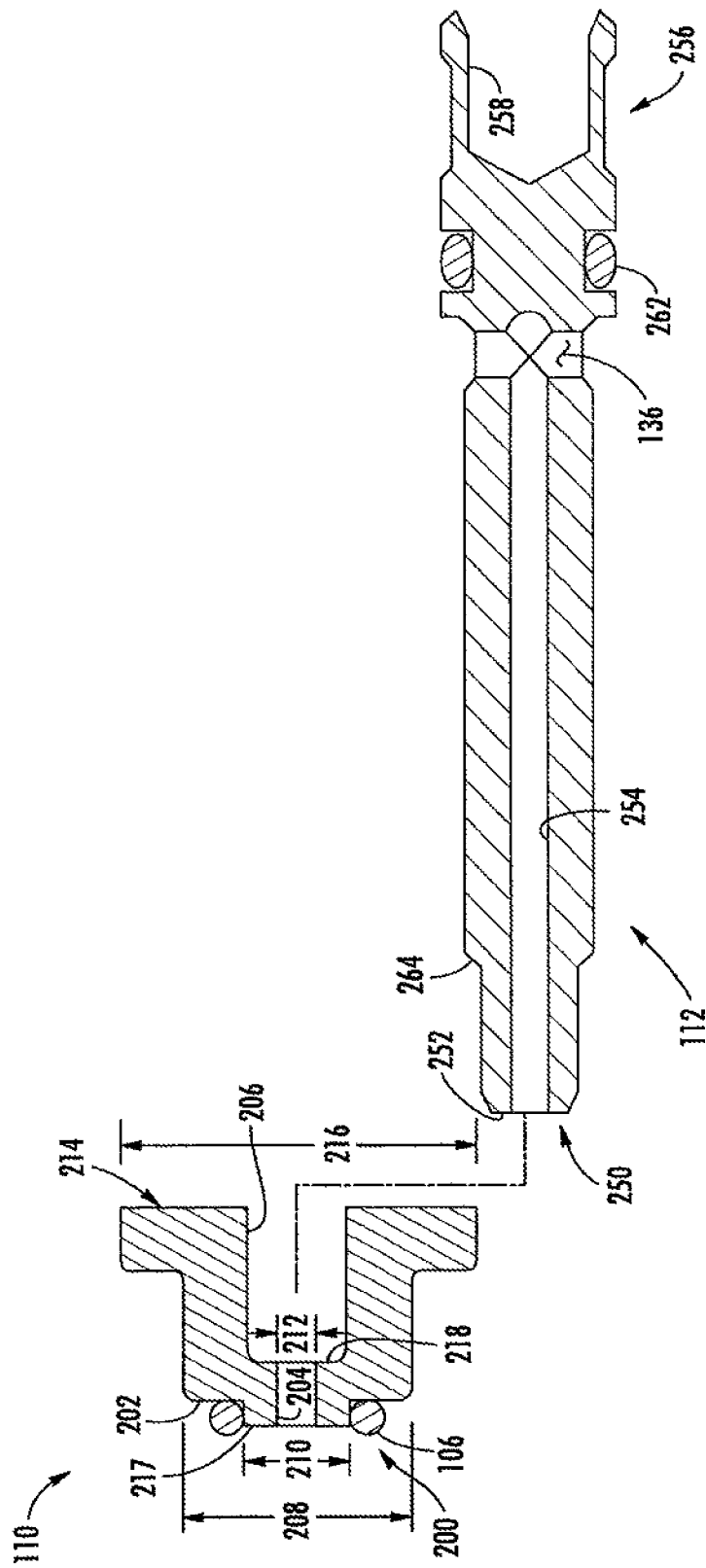
FIG. 3 depicts an exploded cross sectional view of a poppet assembly and an input rod of a brake booster assembly, depicted in FIG. 1.

Referring to FIG. 3, an exploded cross sectional view of the poppet assembly 110 and the input rod assembly 112 is provided. The poppet assembly 110 includes a forward portion 200, the seal 106, a recessed forward poppet face 202, a poppet vent path 204, and a rearward facing cavity 206. The recessed forward poppet face 202 is defined by an outer diameter 208 as well as an inner diameter 210. The diameter 210 is greater than a diameter 212 of the poppet vent path 204 and is smaller than the outer diameter 208. The seal 106 is positioned on the recessed forward poppet face 202. While not shown, an annular grove may be provided to receive the seal 106. The seal 106 may also be an over-molded member that is integrally molded with the forward portion 200. The poppet vent path 204 extends between an outer forward poppet face 217 and an inner portion 218 of the forward portion 200 of the poppet assembly 110.

The seal 106 is configured to seal the poppet vent path 204 by engaging the active face 184 of the primary piston 150. A rear portion 214 of the poppet assembly 110 has a diameter 216.

Also depicted in FIG. 3 is the cross sectional view of the input rod assembly 112. The input rod assembly 112 includes a forward portion 250, a forward face 252, a booster vent path 254, a rear portion 256, and a rearward cavity 258. The forward portion 250 interfaces with the rearward facing cavity 206 of the poppet assembly 110. This interface may be a press-fit, a threaded connection, or other types of interface that firmly connects the poppet assembly 110 to the input rod assembly 112. When assembled, the booster vent path 254 is substantially aligned with the poppet vent path 204. The booster vent path 254 extends from the front portion 250 to the rear portion 256 terminating at the second radial vent 136. A seal 262 provides a sealing interface between the input rod assembly 112 and the reduced diameter portion 138 of the sleeve bearing assembly 114 (see FIG. 1). The interface between the forward face 252 and an inner portion 218 provides a limit for how far the input rod assembly 112 can be press fit into the rearward facing cavity 206 of the poppet assembly 110. The limit may also be provided by a frictional interface between the forward portion 200 of the poppet assembly 110 and the forward portion 250 of the input rod assembly. Alternatively, the step 264 may be configured to provide the travel limit, however, the step 264 may be preferably a square step in this configuration. The rearward cavity 258 receives the rod 108 (see FIG. 1) in an axially secure manner without restricting the angular orientation of the rod 108 relative to the input rod assembly 112.

In operation, the braking system 100 is in the unapplied position as depicted in FIG. 1. The low pressure chamber 126, which includes the first radial vent 134 and the second radial vent 136, vents to the reservoir (not shown) through the fluid passage 128. The booster chamber 122 is in fluid communication with the regulated pressure source (not shown) through the fluid inlet 124. The primary chamber 162 (see FIG. 2) fluidly communicates with the reservoir (not shown) through the inlet 156. The primary chamber 162 also fluidly communicates with the downstream braking circuit (not shown) through the outlet 158. The input rod spring (not shown) biases the rod 108 to the right (with reference to FIG. 1). A piston spring (not shown) also biases the piston 150 to the right (with reference to FIGS. 1 and 2). As a result, in the unapplied position the piston 150 is engaged with the poppet assembly 110. In the unapplied position the pressure within the boost chamber 122 (via the fluid inlet 124) is at or near the pressure of the reservoir (not shown). The pressure in the low pressure chamber 126 is the same as the pressure within the reservoir (not shown).

As an operator of a vehicle applies force to the brake pedal (not shown), the rod 108 moves leftward with reference to FIG. 1. Since the rod 108 is fixedly coupled to the input rod assembly 112, the input rod assembly 112 also moves leftward which causes the poppet assembly 110 to move leftward. The leftward movement of the poppet assembly 110 firmly seals the poppet assembly 110 against the primary piston 150 by engaging the seal 106 with the active face 184.

The valve system (not shown) coupled to the high pressure source (not shown) regulates pressure within the booster chamber 122 in response to position of the brake pedal (not shown) by injecting regulated fluid into the boost chamber 122 through the fluid inlet 124. Generally, a more depressed position of the brake pedal (not shown) corresponds to a higher fluid pressure within the booster chamber 122. With the poppet assembly 110 sealed against the acting face 184 of the primary piston 150, fluid pressure within the booster chamber 122 acts on the active face 172 and partially on active face 184 of the piston 150 (see FIG. 2) which causes the poppet assembly 110 and the primary piston 150 to move leftward.

The leftward movement of the primary piston 150, closes the inlet 156, and isolates the reservoir (not shown) from the primary chamber 162 allowing fluid within the primary chamber 162 to be pressurized. Other configurations of a primary chamber 162 are also possible, and known to a person of ordinary skill in the art. For example, a poppet valve assembly may be used that is coupled to a fluid inlet. In this configuration the fluid inlet, which is fluidly coupled to the reservoir, may be at axially distal end of the primary chamber 162. Since the primary chamber 162 is in fluid communication with the downstream braking circuit (not shown), pressurizing the primary chamber 162 pressurizes fluid in the downstream braking circuit (not shown) which provides the desired braking function.

With the leftward movement of the primary piston 150, a force F acts on the active face 168 of the front portion 164 of the primary piston 150. The force F may be generated by a combination of a biasing force due to the piston spring (not shown) biasing the primary piston 150 rightwardly as well as a rightward force generated by the pressure of fluid within the primary chamber 162 acting on the active face 168.

In a mechanical coupling between the brake pedal (not shown) and the valve system (not shown) a delay may be experienced between movement of the brake pedal (not shown) and pressure buildup in the boost chamber portion 102. After this initial delay, the valve system (not shown) pressurizes the booster chamber 122. Due to this delay, at the initial depression of the brake pedal (not shown) fluid in the booster chamber 122 may not be immediately pressurized.

At the initial depression and throughout travel of the brake pedal (not shown), the operator applies a force against the biasing force of the input rod spring (not shown). Corresponding to a position of the brake pedal (not shown) the valve system (not shown) generates a predefined pressure within the booster chamber 122 as discussed above and as is known in the art. The pressurized fluid in the booster chamber 122 acting on the active surface 172 generates the leftward force F' (see FIG. 1) that tends to move the primary piston 150 leftward. The leftward movement of the primary piston 150 pressurizes fluid in the primary chamber 162 which together with the biasing force of the piston spring (not shown) acting on the primary piston 150 generate the force F.

Figure 4:
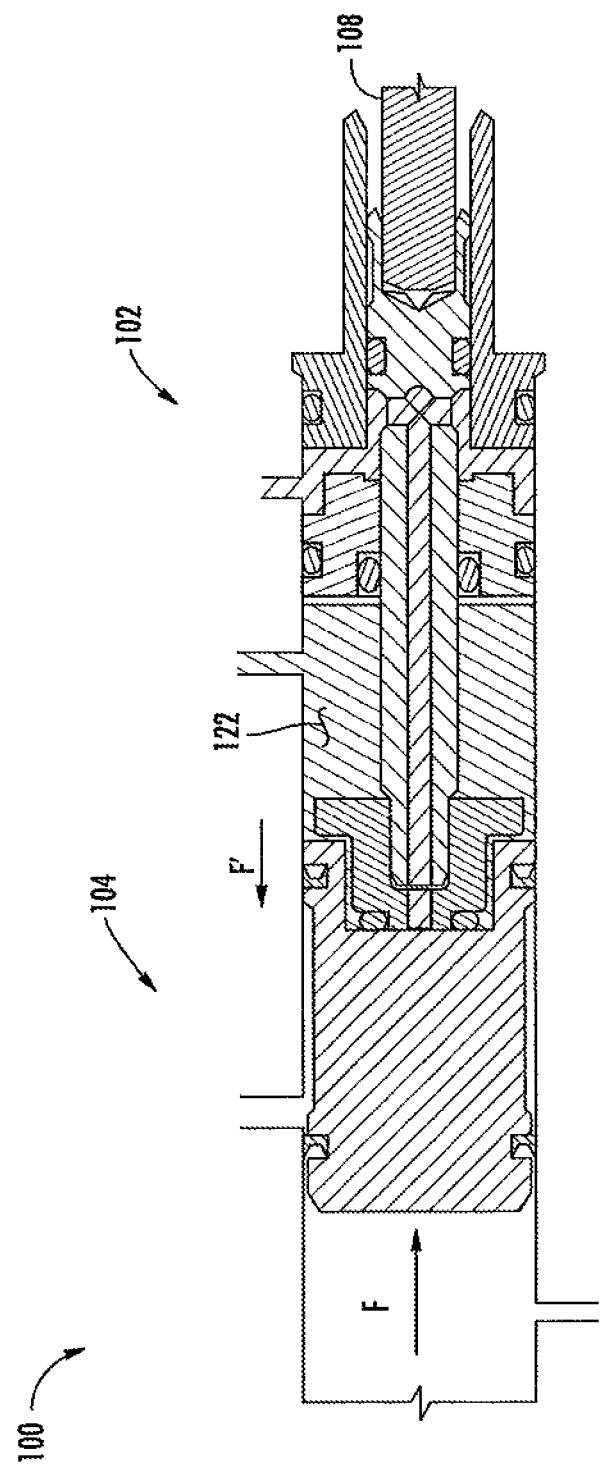
FIG. 4 depicts a fragmentary cross sectional view of the brake system of FIG. 1 depicted in a second position.

The foregoing results in the braking system 100 changing from the condition depicted in FIG. 1 to the condition depicted in FIG. 4. In FIG. 4, the forces acting on the braking system 100 are in equilibrium. The forces include the force F', the complementary force F, and the force applied by the operator to the brake pedal (not shown).

Figure 5:
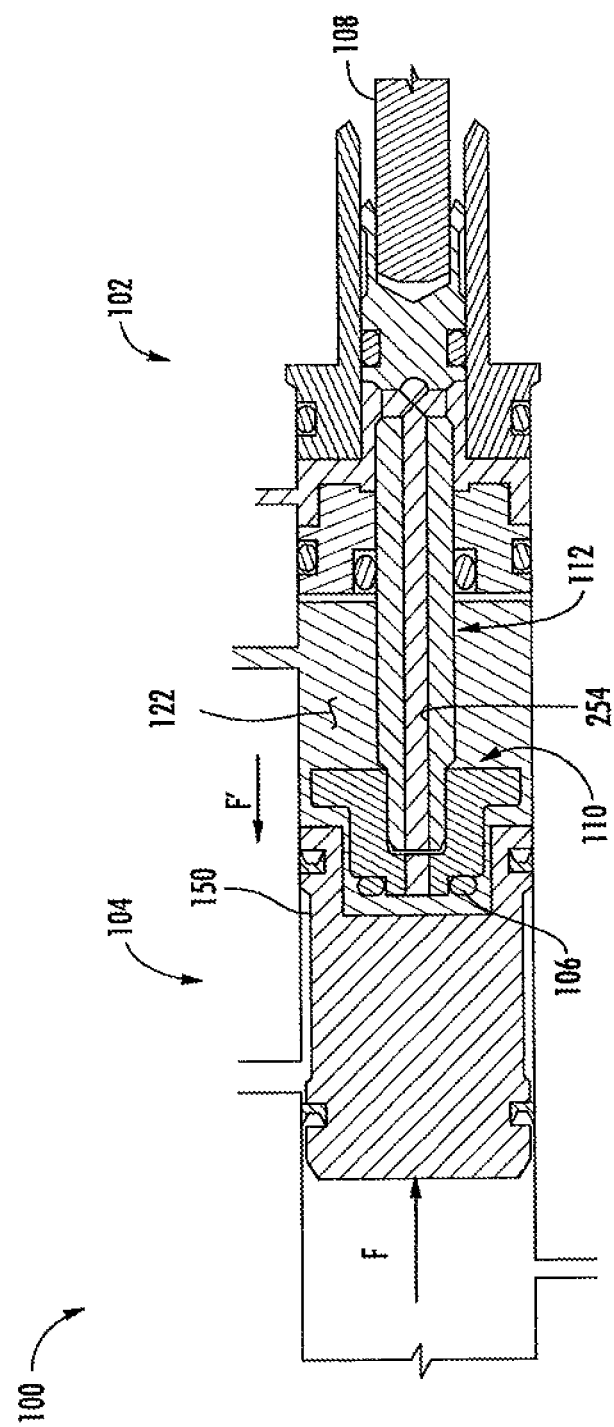
FIG. 5 depicts a fragmentary cross sectional view of the brake system of FIG. 1 depicted in a third position.

Upon a partial release in force applied by the operator to the brake pedal (not shown), the braking system 100 changes to the condition shown in FIG. 5, wherein the poppet assembly 110 and the primary piston 150 (see FIGS. 1 and 2) are in a second position. In FIG. 5, the input rod 108 has moved to the right (to a third position) from the position depicted in FIG. 4. At the third position, the decreased brake pedal force establishes a lower pressure within the booster chamber 122. The reduced pressure condition is obtained by venting through the booster vent path 254 of the input rod assembly 112 to the reservoir (not shown), as described below.

Figure 6:
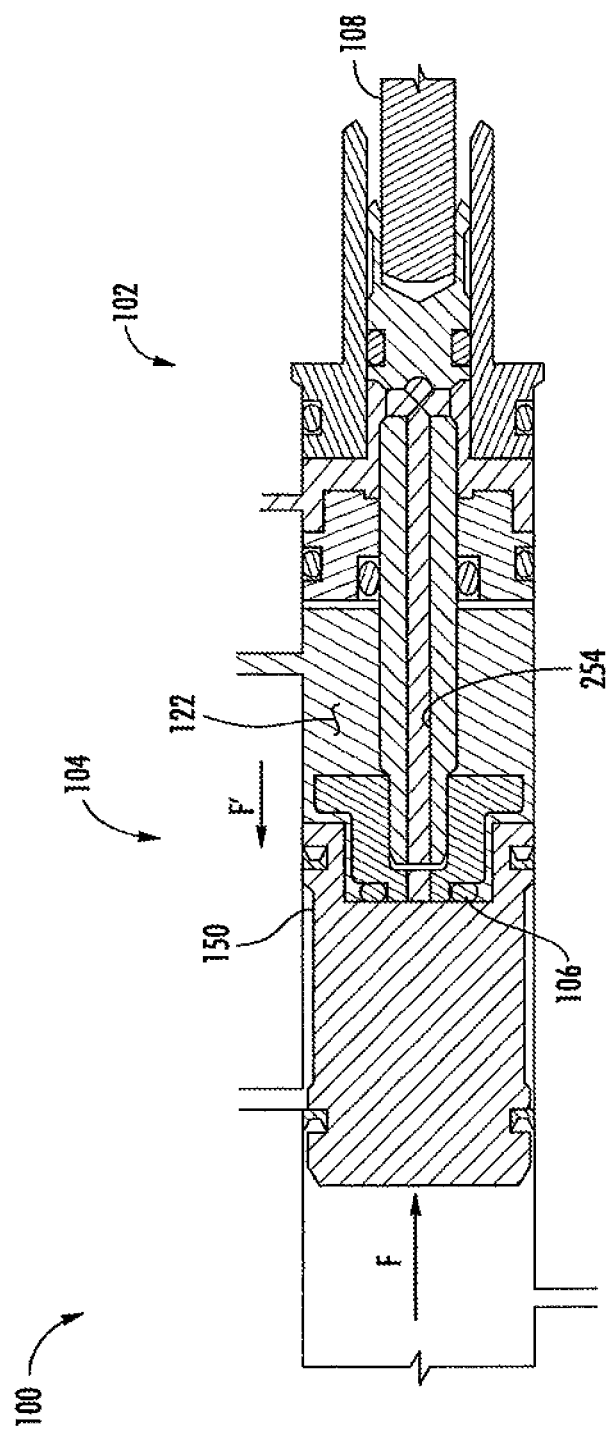
FIG. 6 depicts a fragmentary cross sectional view of the brake system of FIG. 1 depicted in a fourth position.

As the input force from the brake pedal through the input rod 108 is decreased, the equilibrium condition on the input rod 108 is modified such that the forces pushing the input rod 108 to the left are now less than the forces pushing the input rod 108 to the right. Therefore, the rod 108 moves rightward. As a result of right ward movement of the rod 108, the input rod assembly 112 moves to the right, which moves the poppet assembly 110 to the right. The rightward movement of the poppet assembly 110 breaks the seal of the seal 106 with the primary piston 150. A small amount of regulated pressure fluid within the booster chamber 122 travels between the poppet assembly 110 and the active face 184 of the primary piston 150 over the seal 106, and follows a vent path to the reservoir (not shown). The vent path includes the poppet vent path 204, the booster vent path 254 of the input rod assembly 112, the second radial vent 136, the annular vent chamber 132, the first radial vent 130, and the fluid passage 128 (see FIGS. 1 and 3). As this small amount of high pressure fluid is vented to the reservoir (not shown), the pressure within the booster chamber 122 decreases which decreases the leftward force F'. The rightward force F remaining at the previous level is now larger than the force F'. As a result, the primary piston 150 travels rightward and the rear portion 166 again seals against the seal 106 establishing a fourth position, as depicted in FIG. 6.

Figure 7:
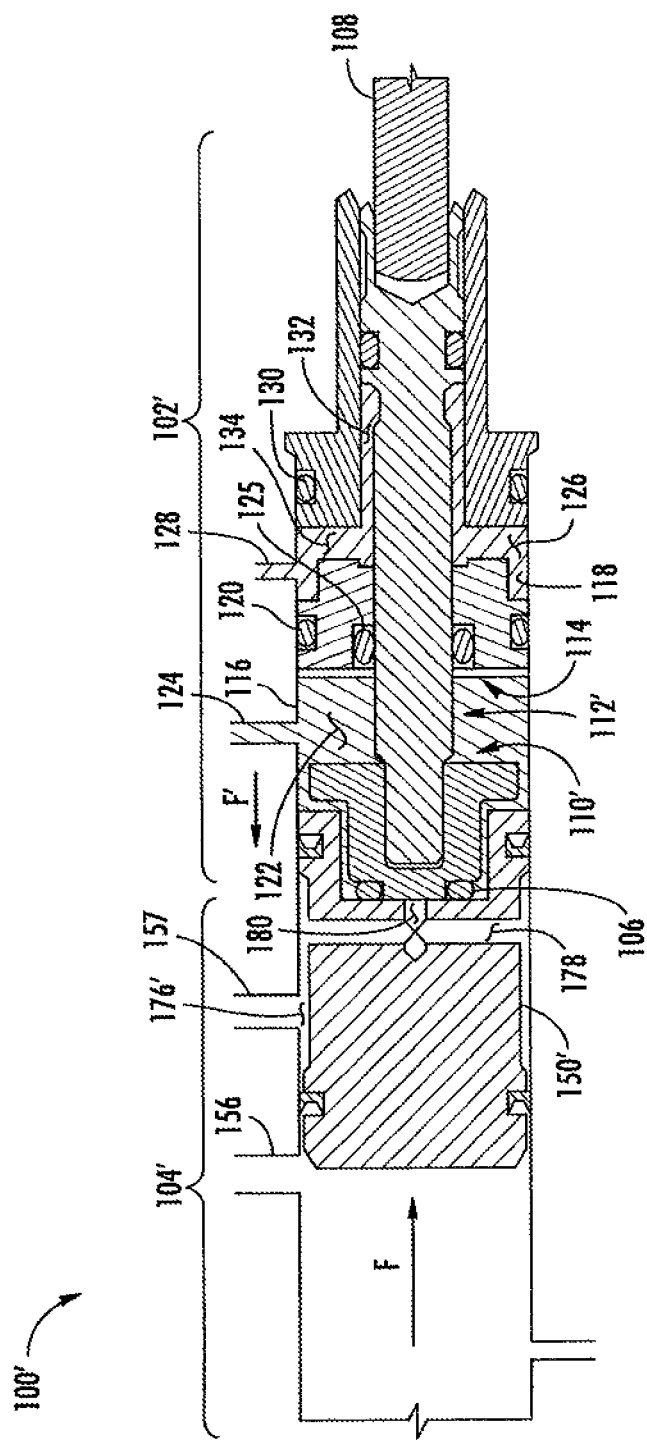
FIG. 7 depicts a fragmentary cross sectional view of the brake system of FIG. 1 with an alternative vent path through the primary piston.

Referring to FIG. 7, an alternative embodiment of a braking system 100' is depicted. The braking system 100' is similar to the braking system 100 depicted in FIGS. 1, 4, 5, and 6. The references discussed in these figures also apply to FIG. 7, with some differences. The braking system 100' includes a boost chamber portion 102' which is sealingly coupled with a master cylinder portion 104' by a seal 106.

The braking system 100' includes an input rod assembly 112' which does not include a vent path. Furthermore, the braking system 100' includes a poppet assembly 110' which also lacks a vent path.

In this alternative embodiment, the boosted pressure within the chamber 122 is vented through the primary piston 150' via a vent path which includes a center vent path 180, a fluid passage 178, an annular space 176', and a housing fluid outlet 157.

Figure 8:
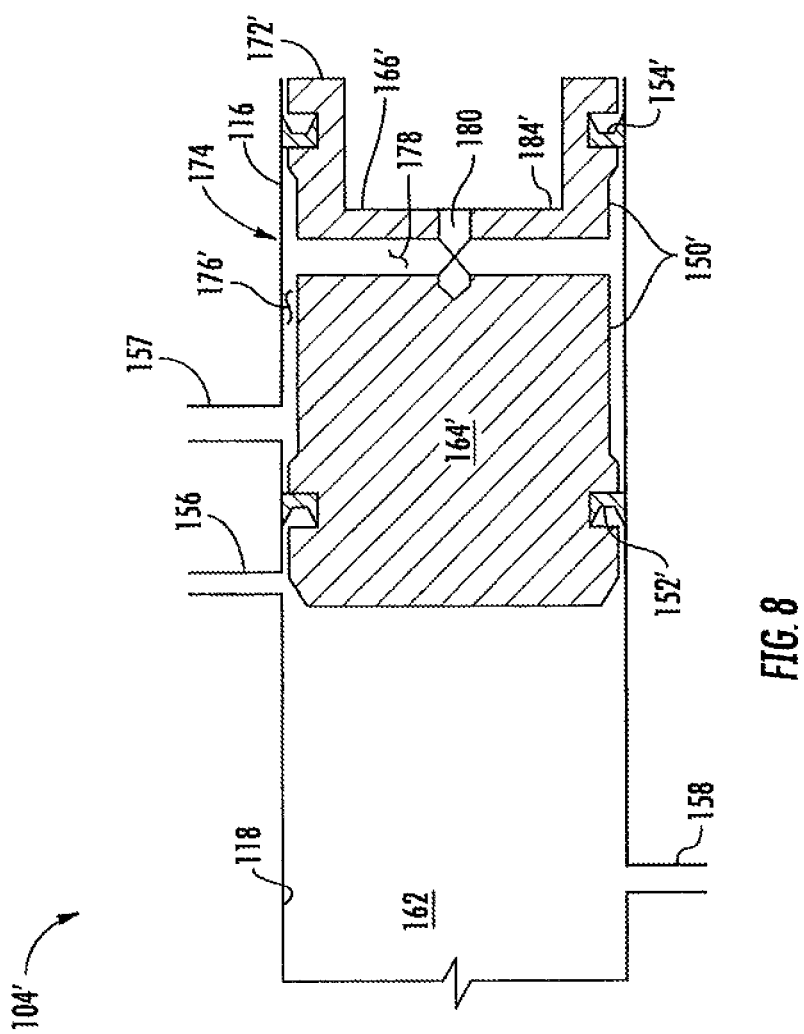
FIG. 8 depicts a cross sectional view of a master cylinder portion of the brake system depicted in FIG. 7.

Referring to FIG. 8, a cross sectional view of the master cylinder portion 104' is depicted. A vent chamber 174 is defined between seals 152' and 154'. The vent chamber 174 establishes the aforementioned vent path. The annular space 176' is formed by a reduced area of the piston 150' between a front portion 164' and a rear portion 166' and the cylinder 116. The fluid passage 178 is a space defined between the front portion 164' and the rear portion 166' and is in fluid communication with the annular space 176'. The center vent path 180 is centrally formed in the rear portion 166 and is in fluid communication with the fluid passage 178 and in selective fluid communication with the booster chamber 122.

Similar to the braking system 100, the seal 152' is configured to seal the primary chamber 162 from the inlet 156. The seal 154' is configured to seal the boost chamber 122 from the inlet 156. The poppet assembly 110' seals against the rear portion 166' of the primary piston 150' similar to the braking system 100 by engaging the seal 106 against an active face 184' of the primary piston 150'. When the seal 106 is disengaged from the active face 184', fluid within the boost chamber 122 is allowed to vent through the aforementioned vent path to the reservoir (not shown).

With respect to both embodiments of the braking circuit (100 and 100'), the aforementioned movements of the rod 108 and the poppet assembly 110 (110') as well as the primary piston 150 (150') provide a modulation of the regulated pressure within the booster chamber 122. This modulation is in response to the operator applying pressure to the brake pedal (not shown) and thereafter partially or completely releasing the brake pedal. The purging of high pressure fluid within the booster chamber 122 (via the vent path described with reference to the first embodiment of the braking system 100 or the vent described with reference to the second embodiment of the braking system 100') provides for a more efficient movement for the primary piston 150.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A hydraulic brake booster system, comprising:
   a primary piston axially moveable within a bore of a cylinder;
   a booster chamber located rearwardly of the primary piston within the bore;
   an input rod extending within the booster chamber, the input rod having a first diameter and including a forward portion;
   a booster vent path in selective fluid communication with the booster chamber; and
   a seal member located between the forward portion face and the primary piston, the seal member in a fixed relationship with the input rod and configured to (i) seal the booster vent path from the booster chamber when the input rod is in a first position, and (ii) not seal the booster vent path from the booster chamber when the input rod is moved rearwardly within the booster chamber to a second position
   a poppet assembly fixedly attached to the forward portion of the input rod, the poppet assembly including a forward poppet face and a rear portion having a second diameter larger than the first diameter, wherein the seal member is sealingly engaged with the forward poppet face and wherein the booster chamber is located rearwardly of the rear portion when the input rod is in the first position.

2. The hydraulic brake booster system of claim 1, wherein the input rod includes the booster vent path, the booster vent path extending rearwardly from the forward portion of the input rod.

3. The hydraulic brake booster system of claim 1, wherein the primary piston includes the booster vent path, the booster vent path extending forwardly from a rearward face of the primary piston.

4. The hydraulic brake booster system of claim 1, further comprising:
   a reduced diameter portion of the cylinder bore;
   an annular vent chamber defined by the reduced diameter portion and the input rod;
   a first radial vent extending radially from the annular vent chamber; and
   a second radial vent extending radially from the booster vent path to the annular vent chamber, wherein the poppet assembly includes a poppet vent path extending from the forward poppet face.

5. The hydraulic brake booster system of claim 4, wherein:
   the primary piston includes a rearwardly facing cavity;
   the forward poppet face is on a forward portion of the poppet assembly; and
   the forward portion of the poppet assembly is sized to fit within the rearwardly facing cavity of the piston.

6. The hydraulic brake booster system of claim 4, further comprising:
   a sleeve bearing positioned between the reduced diameter portion of the cylinder bore and the booster chamber.

7. The hydraulic brake booster system of claim 6, wherein:
   the poppet assembly includes a rearwardly facing cavity;
   the poppet vent path extends from the forward poppet face to the rearwardly facing cavity of the poppet assembly; and
   the forward portion of the input rod is press fit within the rearwardly facing cavity of the poppet assembly.

8. The hydraulic brake booster system of claim 7, wherein the poppet vent path is aligned with the booster vent path.

9. A hydraulic brake booster system, comprising:
   a primary piston axially moveable within a bore of a cylinder;
   a booster chamber located rearwardly of the primary piston within the bore;
   an input rod extending within the booster chamber, the input rod including forward portion;
   a booster vent path in selective fluid communication with the booster chamber; and
   a seal member located between the forward portion and the primary piston, the seal member in a fixed relationship with the input rod and configured to (i) seal the booster vent path from the booster chamber when the input rod is in a first position, and (ii) not seal the booster vent path from the booster chamber when the input rod is moved rearwardly within the booster chamber to a second position, wherein:

a poppet assembly includes a forward poppet face and a rearwardly facing cavity;

a poppet vent path extends from the forward poppet face to the rearwardly facing cavity; and the forward portion of the input rod is press fit within the rearwardly facing cavity.

10. A hydraulic brake booster system, comprising:

a cylinder bore;

a primary piston axially moveable within the cylinder bore;

a booster chamber defined between the primary piston and a sleeve bearing;

an input rod extending forwardly through the sleeve bearing toward the primary piston, the input rod including a forward portion;

a booster vent path extending rearwardly from the forward portion of the input rod; and an annular seal member fixedly associated with the input rod and movable therewith, the seal member positioned between the forward portion of the input rod and the primary piston and configured to form a seal with the primary piston isolating the booster vent from the booster chamber a poppet assembly sealingly attached to the forward portion of the input rod, the poppet assembly including a forward poppet face in opposition to the primary piston and a poppet vent path extending rearwardly from the forward poppet face, wherein the annular seal member is sealingly engaged with the forward poppet face, wherein:

the poppet assembly includes a cavity opening from a rearward face of the poppet assembly;

the poppet vent path extends from the forward poppet face to the cavity; and the forward portion of the input rod is press fit within the cavity.

11. The hydraulic brake booster system of claim 10, further comprising:

an annular vent chamber adjacent to an outer periphery of the input rod;

a first radial vent extending radially outward from the annular vent chamber; and a second radial vent extending radially between the booster vent path and the annular vent chamber.

12. The hydraulic brake booster system of claim 11, wherein:

the primary piston includes a cavity extending forwardly from a rear portion of the primary piston;

the forward poppet face is on a forward portion of the poppet assembly; and the forward portion of the poppet assembly is sized to fit within the primary piston cavity.

13. The hydraulic brake booster system of claim 10, wherein:

the forward poppet face has a first diameter;

the poppet vent path has a second diameter;

the annular seal member has a third diameter; and the third diameter is (i) larger than the second diameter, and (ii) smaller than the first diameter.

14. The hydraulic brake booster system of claim 13, wherein the poppet vent path is aligned with the booster vent path.

* * * * *